Nov. 23, 1937.  J. T. DIXON  2,100,133
TRAILER HITCH AND BRAKE ACTUATOR
Filed Nov. 10, 1936   4 Sheets-Sheet 1
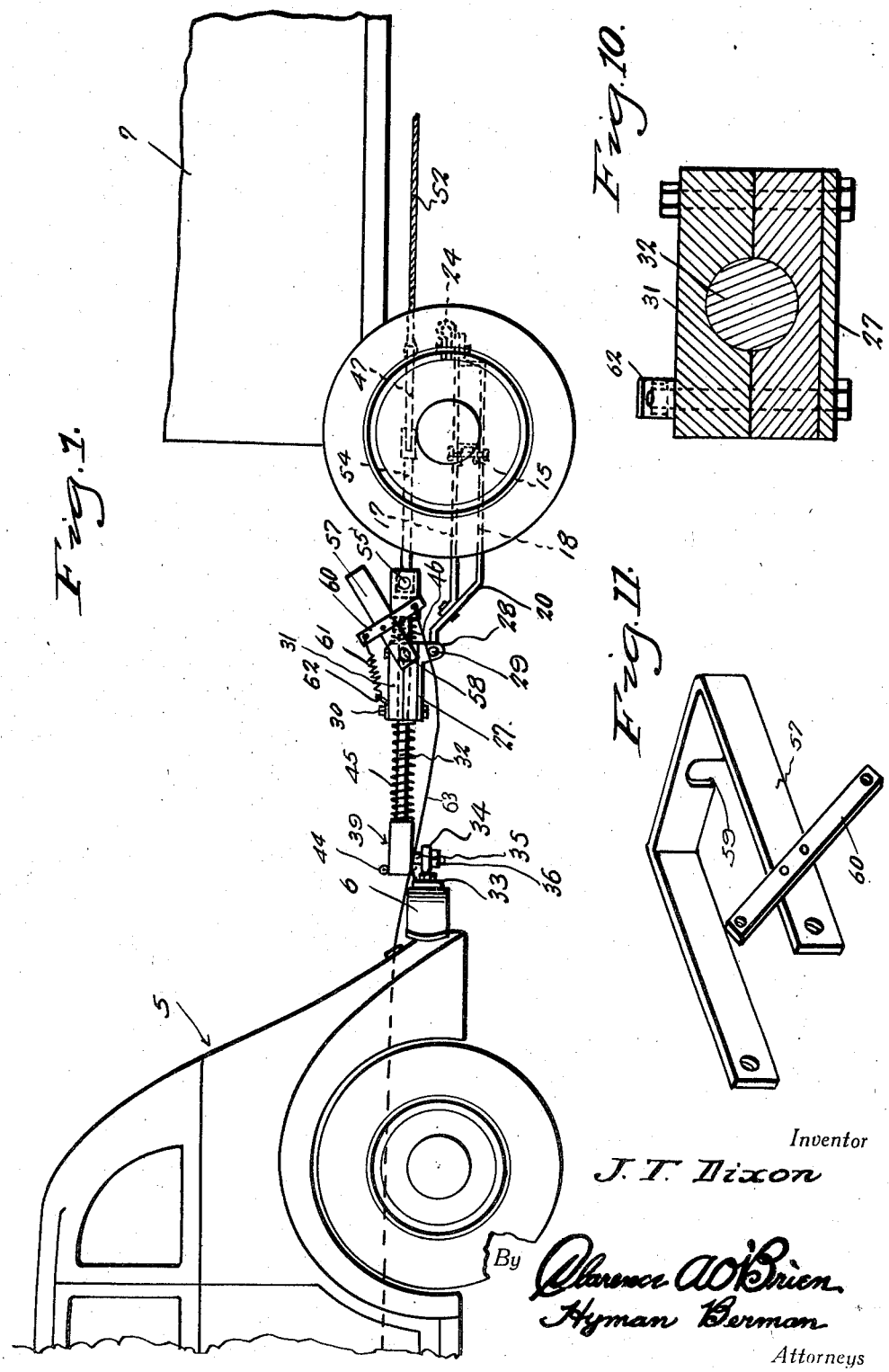
Inventor
J. T. Dixon
By Clarence A. O'Brien
Hyman Berman
Attorneys

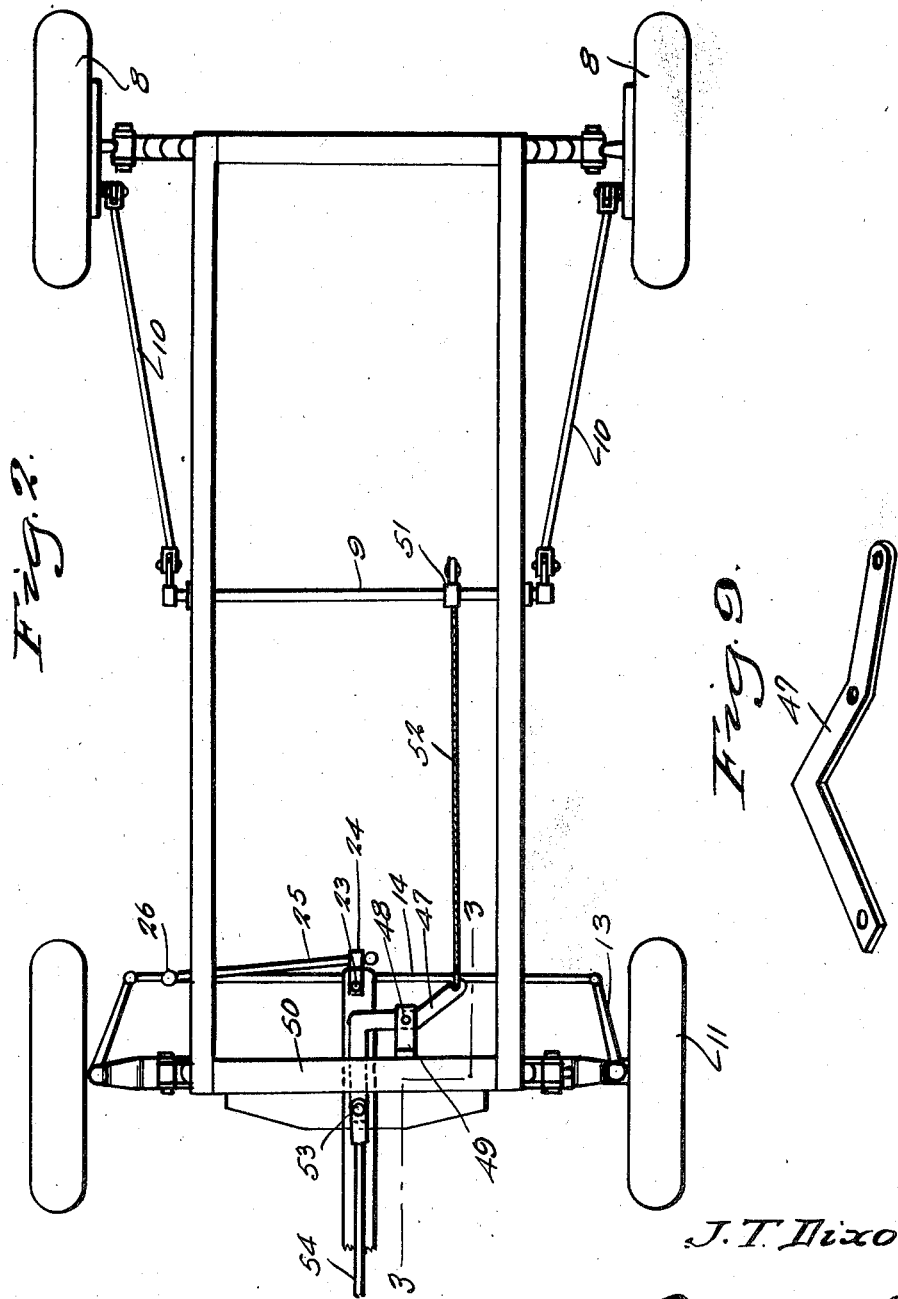

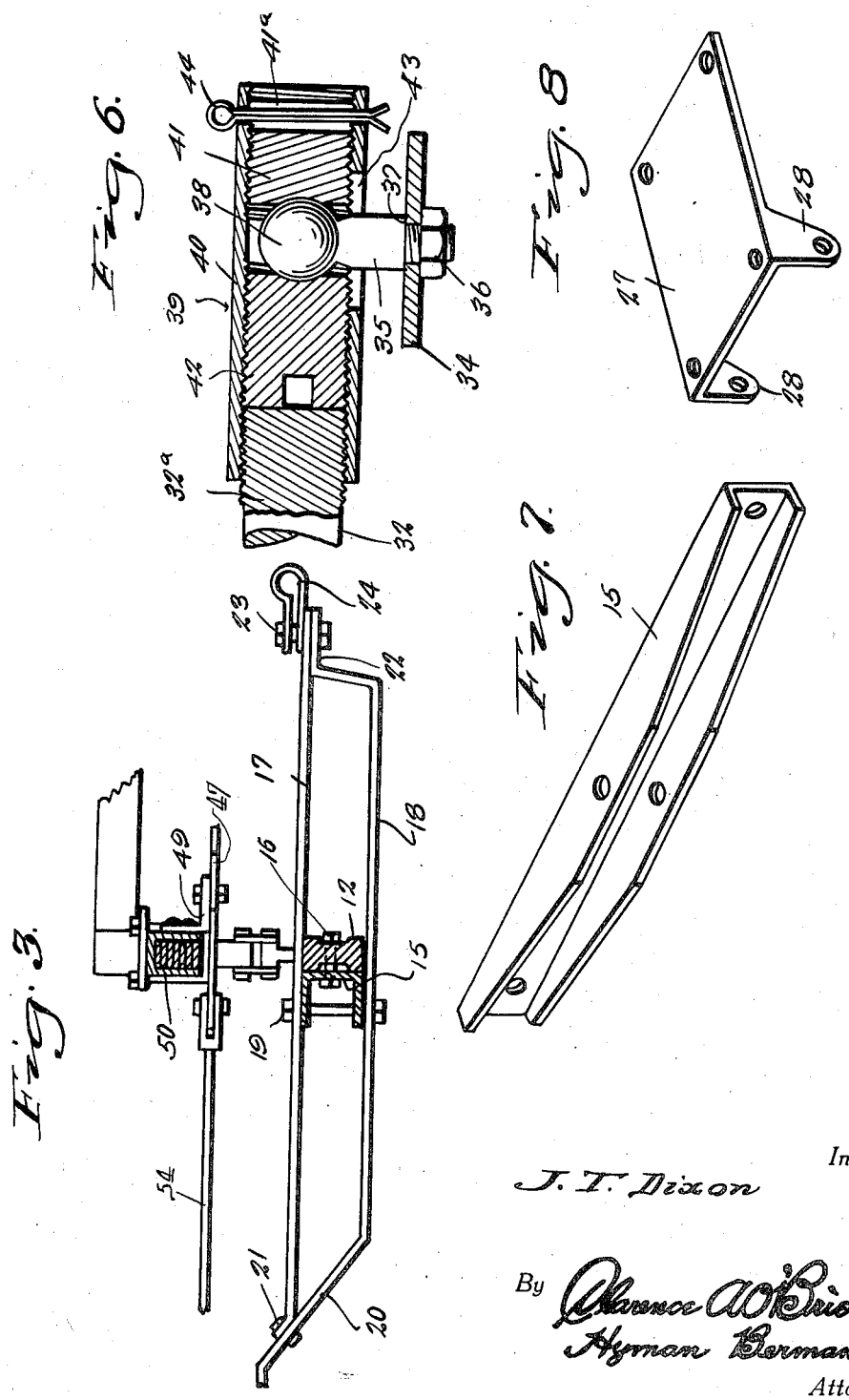

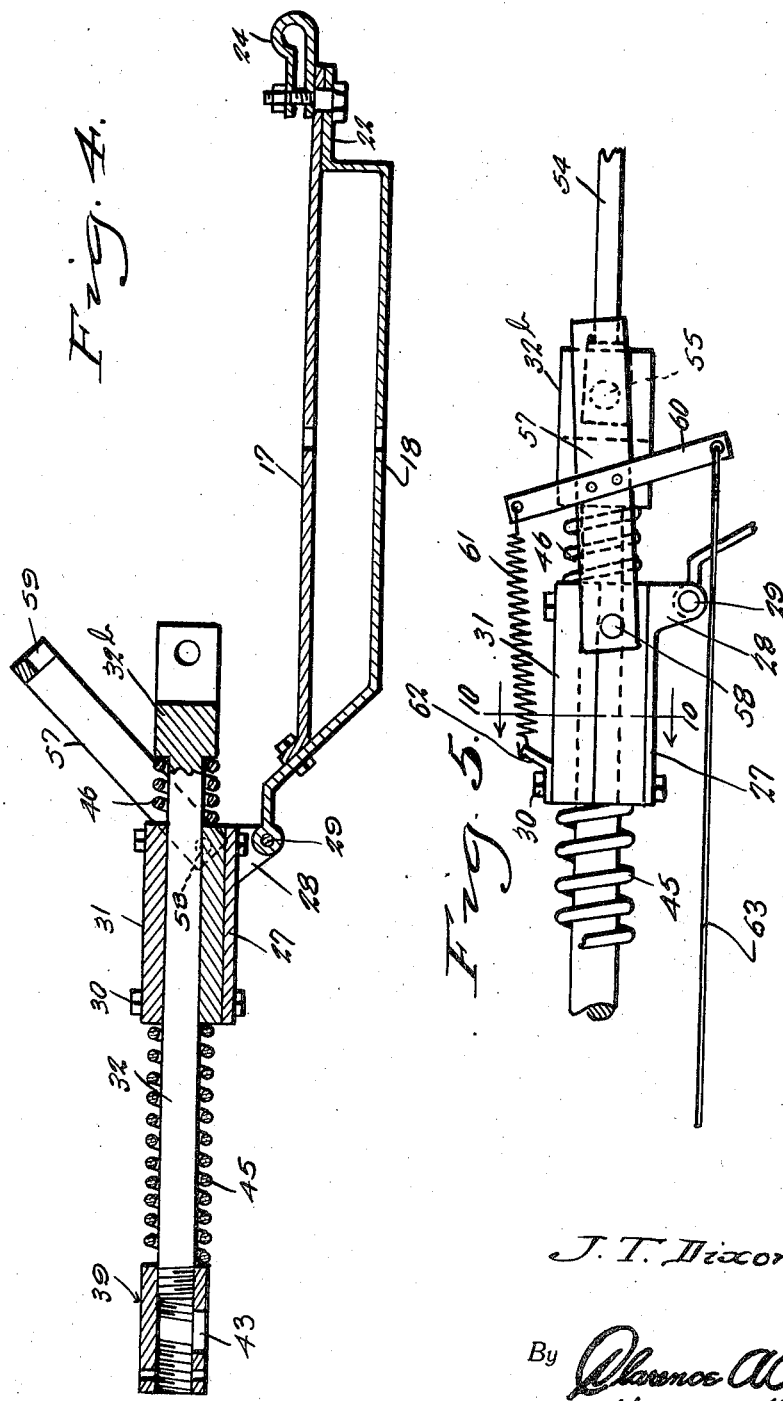

Patented Nov. 23, 1937

2,100,133

UNITED STATES PATENT OFFICE 2,100,133

TRAILER HITCH AND BRAKE ACTUATOR

Jodie T. Dixon, Luxora, Ark.

Application November 10, 1936, Serial No. 110,143

2 Claims. (Cl. 188—142)

This invention relates to means for coupling a trailer with a draft vehicle and for automatically controlling the brakes associated with the wheels of the trailer; and the invention together with its objects and advantages will be best understood from a study of the following description taken in connection with the accompanying drawings wherein:—

Figure 1 is a side elevational view illustrating the application of the invention.

Figure 2 is a plan view of the trailer with the body part of the trailer removed.

Figure 3 is a detail view partly in section and partly in elevation showing the manner of associating the trailer hitch with the trailer vehicle.

Figure 4 is an enlarged detail sectional view illustrating certain features hereinafter more fully referred to.

Figure 5 is a side elevational view showing certain elements of the hitch in a position to preclude the application of the brakes of the trailer vehicle incidental to a backing up of the vehicle.

Figure 6 is a detail sectional view showing the coupling between the hitch pole and the draft vehicle.

Figure 7 is a perspective view of a channel bar forming part of the invention.

Figure 8 is a perspective view of a plate forming part of the invention.

Figure 9 is a perspective view of a lever.

Figure 10 is a sectional view taken substantially on the line 10—10 of Figure 5 and Figure 11 is a perspective view of a locking member presently described in detail.

Referring to the drawings by reference numerals it will be seen that 5 indicates generally a draft vehicle, the same being in the form of an automobile provided with a rear bumper 6. The trailer vehicle is indicated generally by the reference numeral 7 and may be of any suitable construction.

The rear wheels 8 of the trailer are provided with wheel brakes which are operated through the medium of a brake shaft 9 and rods 10 connecting the brake shaft 9 with the brakes of the wheels 8.

The front wheels of the trailer are indicated by the reference numeral 11, the front axle of the trailer by the reference numeral 12, the spindle arms for the front wheels of the trailer being indicated by the reference numeral 13, while the drag link pivotally connecting the arms 13 is indicated by the reference numeral 14.

In accordance with the present invention there is bolted or otherwise secured to the front axle 12 of the trailer a channel bar 15. The bolts securing the channel bar 15 to the axle 12 are indicated by the reference numeral 16.

Bars 17 and 18 are pivoted to an intermediate portion of the channel bar 15 through the medium of a pivot bolt 19.

The bar 18 has a forwardly and upwardly extending end 20 to which is riveted or otherwise secured one end of the bar 17 as at 21. At its opposite end the bar 18 is also provided with an angular end 22 to which the rear end of the bar 17 is secured through the medium of a bolt 23. Also secured to the bars 17 and 18 through the medium of the bolt 23 is a U-shaped clamp 24 that embraces a rod 25 at one end of the latter, the relatively opposite end of the rod being pivoted to the drag link 14 as at 26. Thus, when the bars 17 and 18 are swung, swinging movement of these bars is transmitted through the rod 25 to the drag link 14 causing the latter to move longitudinally so that the front wheels 11 of the trailer are caused to turn to change the direction of travel of the trailer either to the right or to the left.

A plate 27 is provided adjacent one end thereof with ears 28 through the medium of which and a pivot pin 29 the plate 27 is pivoted to the forward end extension 20 of the bar 18.

Bolted or otherwise secured to the plate 27 as at 30 are the complemental half sections of a guide block 31.

The sections of the guide block 31 are provided with complemental grooves in the meeting faces thereof to provide a bore through which a draft rod 32 has a sliding fit as clearly shown in Figures 4 and 10.

Bolted or otherwise secured as at 33 to the rear bumper 6 of the draft vehicle 5 is a draft plate 34 provided with an opening to receive the threaded end of a stud 35. A nut 36 is engaged with the threaded end of the stud 35 and cooperates with the shoulder portion 37 of the stud to positively secure the stud to the draft plate 34. (See Figures 1 and 6.)

The stud 35 is provided on its upper end with a ball 38 which is received within a socket structure indicated generally by the reference numeral 39.

The socket structure 39 as shown in Figure 6 comprises a tubular housing or barrel 40 into which, from relatively opposite ends thereof are threaded complemental plugs 41, 42 that receive therebetween the head 38 which extends into the housing 40 through a relatively large opening 43 provided in the bottom of the housing.

The block or plug 41 is locked against displacement through the medium of a cotter pin 44 that extends through oppositely disposed openings provided in the boxing 40 and through the kerf 41a provided in one end of the plug or block 41.

The draft rod 32 is provided with a threaded end 32a which screws into one end of the boxing 40 to abut the adjacent plug 42 in a manner to serve to secure the plug 42 locked in position within the boxing and also to complete the hitch connection between the draft and the trailing vehicle.

Disposed on the rod 32 and confined on the rod between one end of the boxing 40 and the guide block 31 is a coil spring 45.

The rod 32 is also provided at its free end with an enlarged bifurcated head 32b and disposed between the head 32b and the block 31 is a coil spring 46.

From the foregoing description, it is apparent that when a pulling strain is exerted upon the rod 32, the spring 46 is compressed and a pulling strain is transmitted to the bars 17 and 18 so that the trailer is moved in a forward direction.

When a pushing strain is exerted upon the bar 32 the force is transmitted through the spring 45, block 31 and the bars 17 and 18 so that the trailer is backed.

When the tractor makes a turn, the rod 32 and the parts connected therewith swing the bars 17 and 18 whereby the drag link 14 is moved longitudinally so that the front wheels 11 of the trailer are steered or directed so that the trailer will move in the same direction as that in which the draft vehicle turns.

For controlling the brakes of the rear wheels 8 of the trailer there is provided an angular lever 47, one leg of which intermediate its end is pivoted as at 48 to a bracket 49 bolted or otherwise secured to the front cross member 50 of the frame of the tractor.

At the free end thereof said leg of the lever 47 is connected with an arm 51 on the rock shaft 9 through the medium of a length of cable or other flexible element 52.

At its free end the other leg or arm of the lever 47 is pivoted as at 53 to one end of a rigid link 54, the other end of which is pivoted to the bifurcated head 32b of rod 32 as at 55.

From the description thus far it will be seen that when the draft vehicle 5 is brought to a stop the trailer vehicle 7 moves forwardly relative to the draft vehicle, a push will be exerted on the rod 32 and from the rod 32 transmitted through the rod 54 for causing the lever 47 to swing in a clockwise direction. This will exert a pull on the cable 52 for rocking the shaft 9 in a direction to apply the brakes of the wheels 8 of the trailer. Likewise, when the draft vehicle 5 begins to move forwardly and a pull is exerted on the rod 32 this pull will be transmitted through the link 54 to the lever 47 causing the latter to swing in a counterclockwise direction releasing tension on the cable 52. The usual springs associated with the wheel brakes will then act to automatically release the brakes of the wheels 8.

To prevent an application of the brakes of the wheels 8 when the lead vehicle 5 and the trailing vehicle 7 are backed, there is provided a substantially U-shaped member 57 that straddles the block 31 and is pivoted to the block as at 58.

At the closed end of the U the member 57 is provided with a notch 59 to receive the link 54 when the member 57 is in the lowered position or in the position shown in Figure 5.

Riveted or otherwise secured to one side of the member 57 is a diagonally disposed bar 60 the upper end of which is connected to a spring 61 that is anchored as at 62 to the block 31. The other end of the bar 60 is connected to one end of a pull cable 63 and extends forwardly through the body of the draft vehicle 5 to terminate within convenient reach of the operator of the vehicle.

From the description thus far it will be seen that the spring 61 normally acts on the member 57 to yieldably hold the same in the raised position shown in Figure 1. When it is desired to back the vehicle, the operator pulls on the cable 63 causing the member 57 to swing downwardly against the action of the spring 51 from the position shown in Figure 1 to a position shown in Figure 5. This places the closed end of the member 57 rearwardly of the head 32b of the bar 32. Thus it will be seen that when a push is exerted on the bar 32 the head 32b of the bar will come into engagement with the closed end of the member 57 thus precluding movement of the bar 32 rearwardly with respect to the draft vehicle and consequently there will be no actuation or movement of the lever 47 as would result through the medium of the cable 52, shaft 9 and rods 10, in the application of the brakes of the wheels 8.

It is thought that a clear understanding of the construction, utility and advantages of an invention of this character whereby a trailer may be readily hitched to a draft vehicle and the brakes of the trailer automatically controlled, will be had without a more detailed description.

Having thus described the invention, what is claimed is:—

1. Coupling apparatus for use on a trailer having steering mechanism, comprising an elongated bar adapted to be pivotally connected with the axle of the trailer, at a point between the ends of said bar, a plate pivotally connected to one end of the bar, a guide block fixedly secured to said plate, a draft rod having a sliding fit through the guide block and provided at one end with means for connecting it to a draft vehicle, said means embodying an abutment, a rod secured at one end to the rear end of the first-mentioned bar and operatively connected to said steering mechanism for transmitting turning movement of the first mentioned bar to said steering mechanism, and thereby steering the trailer, and a spring disposed about the draft rod and having one end bearing against said abutment and a relatively opposite end bearing against said guide block.

2. Coupling apparatus for use on a trailer having steering mechanism and brake mechanisms, respectively, said apparatus comprising an elongated bar adapted to be pivotally connected with the axle of the trailer at a point between the ends of said bar, a plate pivotally connected to one end of the bar, a guide block fixedly secured to the plate, a draft rod having a sliding fit through the guide block and provided at one end with means for connecting it to a draft vehicle, said means embodying an abutment, a rod secured at one end to the rear end of the first-mentioned bar and operatively connected to said steering mechanism for transmitting turning movement of the first-mentioned bar to said steering mechanism, and thereby steering the trailer, a spring disposed about the draft rod and having one end bearing against said abutment and a relatively opposite end bearing against said guide block, means operatively connecting the draft rod with said brake mechanism for applying the brakes upon a push being exerted upon the draft rod, and means connected with said guide block and adapted to be engaged with the draft rod for arresting movement of the draft rod relative to the guide block in one direction, whereby to preclude an application of the wheel brakes when desired and incidental to the backing up of the vehicles.

JODIE T. DIXON.